BEST AVAILABLE COPY
J. STEPHENSON.
Street-Car.
No. 6,429. Reissued May 11, 1875.
FIG. I.
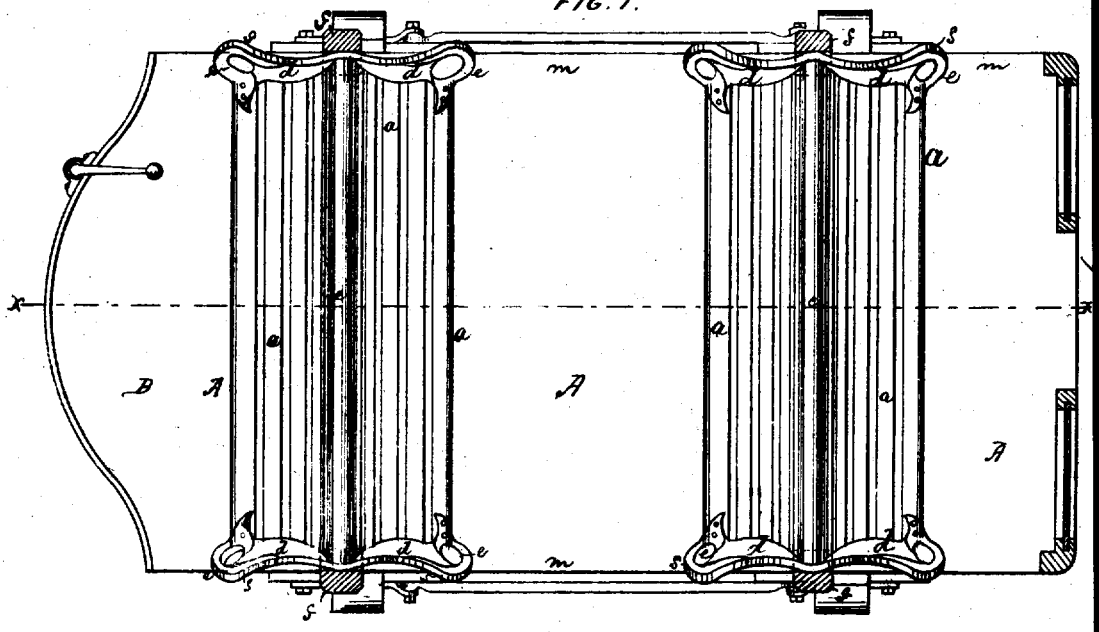
FIG. II.
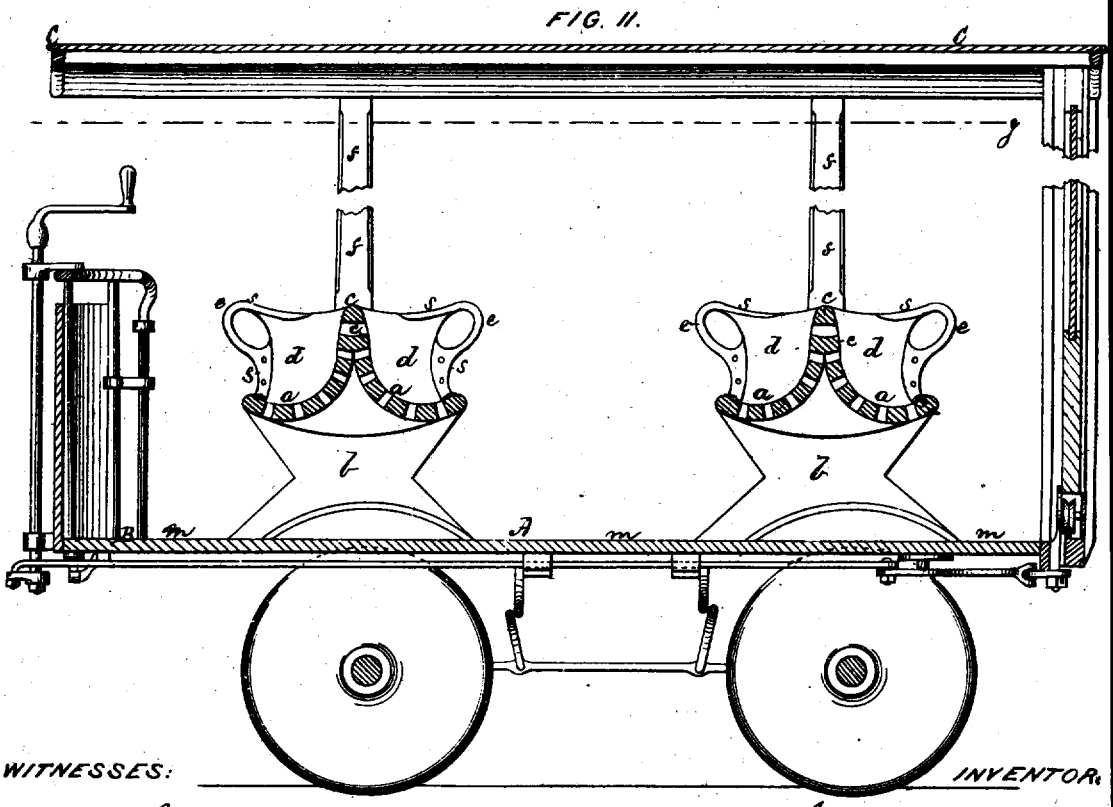
WITNESSES:
D. G. Stuart
L. Van Riswick.
INVENTOR.
John Stephenson
per L. Hanway
atty

UNITED STATES PATENT OFFICE.

JOHN STEPHENSON, OF NEW YORK, N. Y.

IMPROVEMENT IN STREET-CARS.

Specification forming part of Letters Patent No. 155,118, dated September 15, 1874; reissue No. 6,429, dated May 11, 1875; application filed April 20, 1875.

DIVISION *c* OF B B.

*To all whom it may concern:*

Be it known that I, JOHN STEPHENSON, of New York, in the county of New York and State of New York, have invented certain new and useful Improvements in Street-Cars; and I do hereby declare that the following is a full, clear, and exact description thereof, that will enable others skilled in the art to which it appertains to make and use the same, reference being had to the accompanying drawings, and to the letters of reference marked thereon, which form a part of this specification, in which—

Figure 1 represents a horizontal section of a street-car to which my improvements have been applied as taken through the line *y y* of Fig. 2. Fig. 2 represents a vertical longitudinal section of the same, taken through the line *x x* of Fig. 1.

Street-cars which have their exit and entrance openings arranged at their sides, as heretofore constructed, are not only inconvenient but somewhat dangerous to the passengers in entering or leaving the car, this being more especially true with regard to the front and middle seats, as an accidental slip or tumble while the cars are in motion—and there are many passengers too impatient to wait until they stop—may result in the loss of a limb or other serious accident. This difficulty arises from the want of suitable appliances to the car, whereby to enable the passengers to get off and on with ease and safety. To remedy this trouble is the object of this particular branch of my improvement.

My improvement consists in constructing the outer ends of the car-seats with a grab-handle, by means of which to enable the passengers to steady, assist, and support themselves in getting on and off. It also consists in so constructing the head-piece of the seat and its grab-handle as that they will also serve the purpose of an arm rest or support.

To enable others skilled in the art to make, construct, and use my improvement, I will now proceed to describe it in detail.

Here it is proper to observe that the improvement relates solely to that class of street-cars which have their seats arranged transversely to the line of progression of the car—*i. e.*, crosswise of the car—and which have their entrance and exit openings arranged at their sides. Such cars, for economy of space, should be constructed with seats running all the way across from side to side, although it is not absolutely necessary to do so.

The seats represented in the drawings are of that character and may be constructed of any suitable shape for the comfort and convenience of the passengers.

My improvement is illustrated in connection with seats built in pairs—that is, back to back—for economy of space and cost of building, they being supported at each end upon a common supporting-frame, *b*, and having a back, *c*, common to the two. For the same reason, and because it is stronger, each of the end frames of these two seats is also formed in one piece, so as to constitute a single end frame, *d*, instead of two independent end frames—*i. e.*, one for each. The end frame *d* of each seat is provided with a grab-handle, *e*, formed in the manner substantially as shown in Fig. 2—that is to say, of a plate or piece, *f*, of metal, of suitable shape, securely attached to the frame *d* and seat *a*, so as to give a secure hold to the passengers. The peculiar form, however, is not important so long as it furnishes a firm hold for the hand, and is conveniently arranged for being grasped by the passengers. The upper edge of the frame end *d* and grab-handle *e* of each single seat *a* is so constructed as to form a rest or support for the arm of the passenger that sits next to it. It also serves to prevent the passengers from falling out. Each end *d* is firmly fastened to the end of the seats and to the supporting-standards *f* of the roof.

The end *b* and grab-handle *e* may be made of metal and cast in one piece.

A represents the floor of the car; B, the driver's platform; *f f*, the standards that support its roof C, and *m* the exit and entrance openings to the car. The car may or not be provided with a door or doorway at the rear, and will be provided with as many seats as its length will accommodate, due regard being had to the comfort of the passengers.

In this division I lay no claim to the devices shown in the original patent for operating the entrance-door of the car; nor to the elbow arm and rest for turn-over backs, as such form separate divisions of this reissue.

Having thus described my invention, what I claim as new, and desire to secure by Letters Patent, is—

1. A frame end of a car-seat provided with a grab-handle, *e*, substantially as set forth.

2. A frame end of a car-seat provided with a grab-handle, *e*, in combination with a street-car having exit and entrance openings *m* at its sides for the passengers, substantially as set forth.

3. In combination with a street-car having exit and entrance openings *m* at its sides, a car-seat-frame end, *d*, provided with a grab-handle, *e*, the upper edge of both constituting a rest for an arm of the passenger sitting next to it, and the two adapted to prevent the passenger from falling out, substantially as set forth.

4. A frame end, *d d*, for a double car-seat, *a a*, said frame end being made in one piece, and provided with two grab-handles, *e e*, substantially as and for the purposes set forth.

In testimony that I claim the foregoing I have hereunto set my hand this 31st day of October, 1874.

JOHN STEPHENSON.

Witnesses:
WM. JNO. WALKER,
STUART A. STEPHENSON.